(12) United States Patent
Nothofer et al.

(10) Patent No.: US 6,889,712 B2
(45) Date of Patent: May 10, 2005

(54) DEVICE FOR FIXING A CABLE IN A PIPE

(75) Inventors: Klaus Nothofer, Erkrath (DE); Hans-Detlef Leppert, Mönchen-gladbach (DE); Wolfgang Teschner, Wunstorf (DE)

(73) Assignee: Alcatel, Paris (FR)

( * ) Notice: Subject to any disclaimer, the term of this patent is extended or adjusted under 35 U.S.C. 154(b) by 102 days.

(21) Appl. No.: 10/180,303

(22) Filed: Jun. 27, 2002

(65) Prior Publication Data

US 2003/0000591 A1 Jan. 2, 2003

(30) Foreign Application Priority Data

Jun. 27, 2001 (EP) .............................. 01440193

(51) Int. Cl.$^7$ ................................ F16L 55/00
(52) U.S. Cl. .................. 138/108; 138/104; 138/114; 248/49; 174/47
(58) Field of Search ................... 138/108, 104, 138/98, 114, 97; 248/49; 174/47; 405/150.1

(56) References Cited

U.S. PATENT DOCUMENTS

| | | | | |
|---|---|---|---|---|
| 4,368,348 A | * | 1/1983 | Eichelberger et al. ...... | 138/111 |
| 5,010,440 A | * | 4/1991 | Endo ........................... | 138/97 |
| 5,172,730 A | * | 12/1992 | Driver ......................... | 138/104 |
| 5,305,798 A | * | 4/1994 | Driver ......................... | 138/98 |
| 5,395,472 A | * | 3/1995 | Mandich ...................... | 138/98 |
| 5,560,397 A | * | 10/1996 | Miller et al. ................. | 138/110 |
| 5,778,938 A | * | 7/1998 | Chick et al. .................. | 138/98 |
| 5,794,663 A | * | 8/1998 | Kiest, Jr. et al. ............. | 138/98 |
| 5,971,029 A | * | 10/1999 | Smith et al. .................. | 138/98 |
| 6,105,619 A | * | 8/2000 | Kiest, Jr. et al. ............. | 138/98 |
| 6,161,587 A | * | 12/2000 | Durham ....................... | 138/97 |
| 6,286,603 B1 | * | 9/2001 | Parent ......................... | 166/387 |
| 6,311,730 B2 | * | 11/2001 | Penza .......................... | 138/98 |
| 6,463,960 B1 | * | 10/2002 | Madhani et al. .............. | 138/98 |
| 6,604,549 B2 | * | 8/2003 | Gauthier et al. ............. | 138/108 |
| 2002/0170612 A1 | * | 11/2002 | Penza ......................... | 138/108 |

FOREIGN PATENT DOCUMENTS

| | | |
|---|---|---|
| DE | 3904525 A1 | 8/1990 |
| DE | 19819597 A1 | 10/1999 |
| DE | 29811512 A1 | 11/1999 |
| DE | 19826880 A1 | 12/1999 |
| EP | 0065886 A1 | 12/1982 |
| GB | 1553408 | 9/1979 |
| WO | WO 87/03840 A1 | 7/1987 |
| WO | WO 99/65129 A1 | 12/1999 |

* cited by examiner

*Primary Examiner*—James Hook
(74) *Attorney, Agent, or Firm*—Sughrue Mion, PLLC

(57) ABSTRACT

For the purpose of repairing supply lines such as a waste-water pipe, a plastic hose has been developed which, in the clear state, has a diameter which is the same size as, or larger than, the diameter of the pipe in which it is to be inserted. This plastic hose is used to fix optical or electric cables against the inner wall of the pipe. For this purpose, the plastic hose is introduced into the waste-water pipe in a collapsed state, together with the cable, and is released when the desired positioning has been reached. The collapsed plastic hose will then regain its original shape and thereby fix the cable against the inner wall of the waste-water pipe.

12 Claims, 2 Drawing Sheets

DEVICE FOR FIXING A CABLE IN A PIPE

BACKGROUND OF THE INVENTION

The invention is based on a priority application EP01440193.9.

The invention relates to a device and two methods for fixing an optical or electric cable against the inner wall of a pipe.

The use of waste-water, rain-water or mixed-water conduits or other discharge or supply lines for laying communications cables is one possible way, which has already been used, of reducing underground construction costs for the connection of subscribers (access). In addition, it makes possible to expand such connection of subscribers in a demand-orientated and rapid manner, something which has become increasingly important of late because of the large number of operators. In what follows, the term "waste-water conduit" (waste-water pipe) is also intended to cover rain-water conduits, mixed-water conduits and discharge or supply lines. Whereas it is possible, in case of accessible conduits, to employ the existing standard techniques for laying communications cables, the problems in case of inaccessible conduits are still unresolved to a very great extent.

When laying cables in inaccessible waste-water conduits (diameters of less than 20 cm), care has to be taken to ensure that the hydraulically usable cross-sectional area is only slightly reduced;

as far as possible, no objects must be laid transversely to the direction of flow;

no points of attachment are produced which can lead to the formation of snags (for example, the accumulation of sewage materials) and consequently to obstruction; and that cleaning of the waste-water conduit is not prevented.

DE 198 26 880 discloses a device which consists of a plastic element which is annular in cross-section and which, as a result of a memory effect, enlarges its outer diameter when heat is supplied or as a result of moistening. This takes advantage of the reverse shrinkage effect. The device is compressed after shaping, and will expand after being reheated. This reheating then takes place in the waste-water conduit, so that the device rests against the inner wall of the waste-water conduit. The plastic element is introduced into the waste-water conduit in the pressed state, with an optical or electric cable. In the expanded state, the plastic element will fix the optical or electric cable against the inner wall of the waste-water conduit.

Plastics which have a pronounced memory effect consist of a relatively expensive material. In addition, this memory effect is inclined to decline gradually in the course of time. If these plastic elements are used in the form of a hose in order to simultaneously permit repair of the waste-water conduit, the usable clear space of the latter is then restricted to too great an extent. The result of this is that plastic elements of this kind do not represent an ideal solution for both fixing optical or electric cables and repairing the waste-water conduits.

SUMMARY OF THE INVENTION

The object underlying the invention is to develop plastic hoses which can be manufactured in a cost-effective manner and which retain a lasting, satisfactory shape in the installed state in the waste-water conduit.

The object is achieved, according to the invention, by means of a device for fixing an optical or electric cable against the inner wall of a pipe, with the aid of a plastic hose, which is annular in cross-section, wherein, in the clear state, the plastic hose has a diameter which is the same size as, or larger than, the diameter of the pipe; and the methods of fixing an optical or electric cable against the inner wall of a pipe wherein the cable is introduced into the pipe together with the plastic hose in the collapsed state and, after being correctly positioned, is fixed in the said pipe through the fact that an element such as air, gas or liquid is admitted to the said plastic hose; and wherein the cable is introduced into the pipe together with the plastic hose in the collapsed state surrounding a flexible pipe and, after being correctly positioned, is fixed in the said pipe through the fact that an element such as air, gas or liquid is admitted to the said flexible pipe.

The use of ordinary, cost-effective plastics such as polyethylene (PE) or polyvinyl chloride (PVC) can be guaranteed by using a plastic hose which, in the clear state, has a diameter which is the same size as, or larger than, the diameter of the waste-water conduit or pipe in which it is inserted. A plastic hose of this kind according to the invention can be brought into a collapsed state by inserting, for example, a degree of vacuum. This collapsed plastic hose may advantageously be rolled up axially, for example, so as to be introduced into the waste-water conduit without any problems. In this connection, use may be made of a travelling robot which introduces the collapsed, rolled-up hose into the waste-water conduit.

It is quite possible to apply a plastic hose of this kind according to the invention round a flexible pipe, which may optionally have regular openings. When a state of vacuum is set up in the flexible pipe, the plastic hose will collapse onto the latter. In this way, the said plastic hose can be easily introduced into the waste-water conduit together with the flexible pipe, optionally even without a robot. After the state of vacuum has been set aside by the admission of an element such as air, gas or liquid into the flexible pipe, the said element will penetrate into the collapsed plastic hose via the regular openings in the said flexible pipe. The plastic hose will thus attempt to assume its original shape and thereby apply itself against the inner wall of the waste-water conduit over its entire length.

Advantageous refinements of the invention will emerge from the dependent claims, the following description and the drawings.

BRIEF DESCRIPTION OF THE DRAWINGS

An exemplified embodiment of the invention will now be explained with the aid of FIGS. 1 to 6.

DETAILED DESCRIPTION OF THE INVENTION

A pipe 1, for example a waste-water pipe or waste-water conduit, which has a certain cross-section, is drawn in FIG.

1. This pipe may, for example, form the final, lateral stretch to the subscriber's connection.

Figure 1:
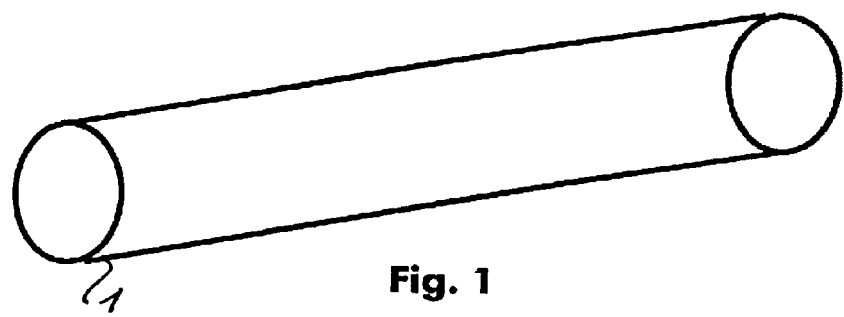
FIG. 1 shows a pipe, for example a waste-water pipe.
Figure 2:
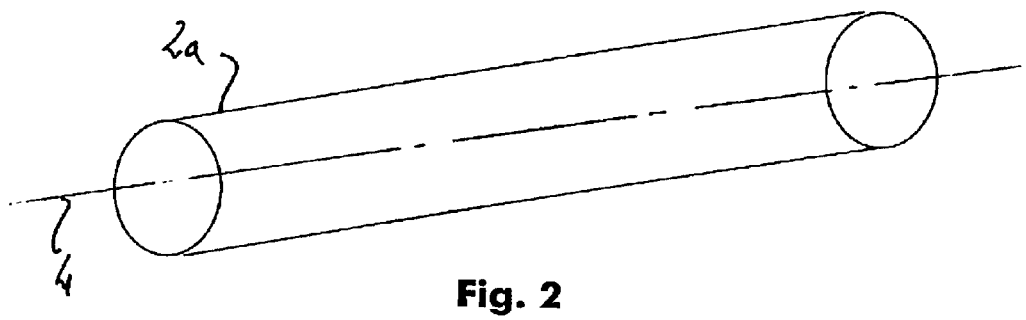
FIG. 2 shows a plastic hose according to the invention in the clear state.
Figure 3:
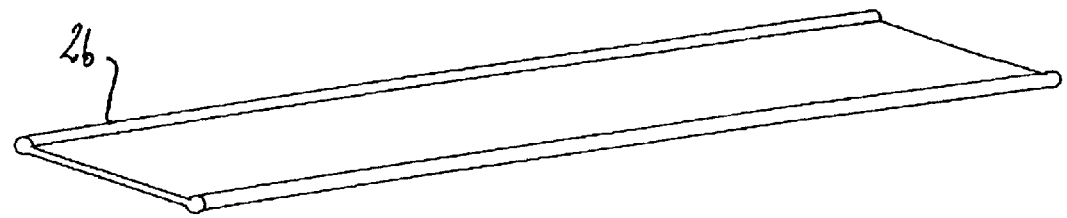
FIG. 3 shows a plastic hose according to the invention in the collapsed state.

A plastic hose 2a according to the invention is drawn in the clear state (i.e.,the free state or natural/original state) in FIG. 2. It has an annular cross-section which is the same size as, or larger than, the diameter of the pipe 1, or rather the inner diameter of the said pipe 1, in which it is laid. It is formed from an ordinary plastic such as PE or PVC. When a vacuum is set up in this hose 2a, it will collapse along its axis 4. This collapsed state 2b is drawn in FIG. 3. In this collapsed state, the plastic hose can be easily rolled up along its axis as long as the state of vacuum is guaranteed. The individual ends must therefore be sealed.

Figure 4:
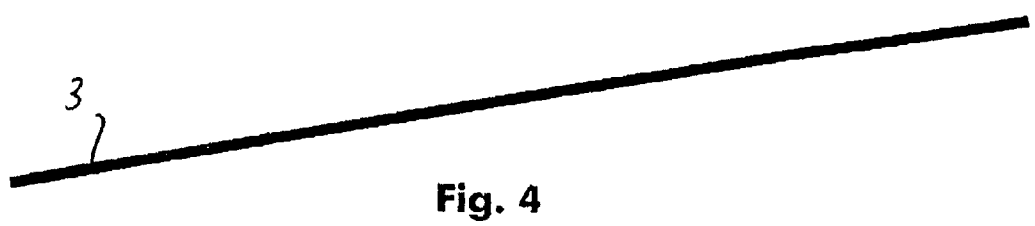
FIG. 4 shows a cable, for example a telecommunications cable.

A typical cable used for telecommunications purposes, that is to say a purely optical or electric cable or a combined cable, is drawn in FIG. 4.

Figure 5:
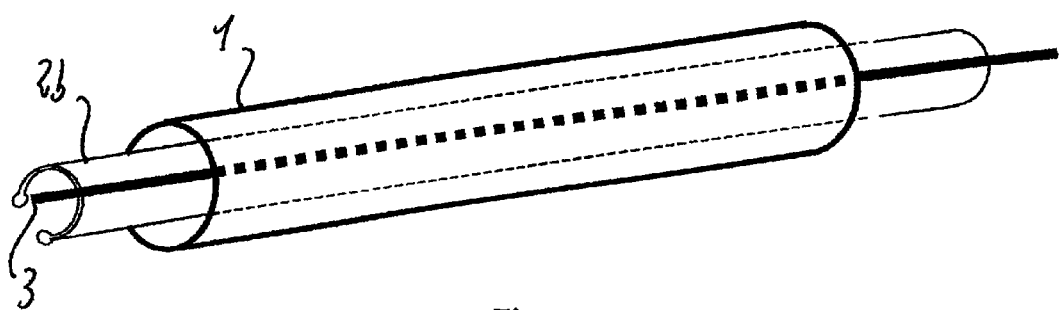
FIG. 5 shows the introduction of the collapsed plastic hose, together with the cable, into the pipe.

In FIG. 5, the plastic hose is introduced into the pipe 1 in the collapsed state 2b, together with the cable 3. It can be seen that, in the collapsed state 2b, the plastic hose is distinctly smaller in cross-section than the cross-section of the pipe 1. The introduction of the said plastic hose, together with the cable to be fixed, can therefore take place easily.

After the introduction of the plastic hose, together with the cable, has been completed, the seals can be destroyed or removed. As a result of this, the plastic hose should be able to assume its original shape again. An element such as air, gas or liquid may optionally be admitted into the plastic hose for this purpose.

Figure 6:
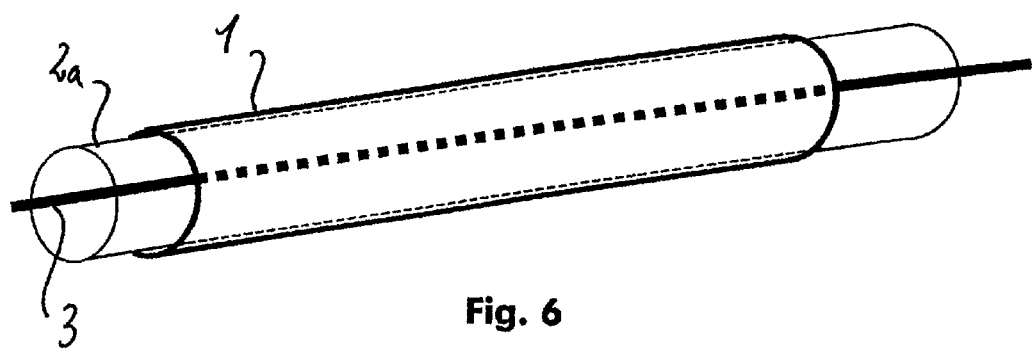
FIG. 6 shows the fixing of the cable in the pipe.

FIG. 6 shows the state in which the plastic hose 2a covers the inner wall of the pipe 1 and, at the same time, fixes the cable 3 to this wall.

It is possible, and in some cases advantageous, to introduce the plastic hose into the pipe 1 with the aid of a flexible pipe. This flexible pipe may have openings in order to cause the plastic hose to collapse uniformly along its entire length more easily, through the fact that the state of vacuum is transmitted to the plastic hose via the said flexible pipe. The collapsed plastic hose 2b may be introduced into the pipe 1 together with the flexible pipe, optionally without a travelling robot. When an element such as air, gas or a liquid is admitted to the said flexible pipe, the collapsed plastic hose 2b will attempt to regain its original shape.

By choosing a cross-section for the plastic hose in the clear state which is the same size as, or even distinctly larger than, the diameter of the pipe into which it is introduced, it is guaranteed that the said plastic hose will retain its shape in a lasting manner. As a result of this, the repair of waste-water conduits, and/or the fixing of telecommunication cables against the inner wall of waste-water conduits of this kind, can take place in a favourable manner.

What is claimed is:

1. A device for fixing an optical or electric cable against the inner wall of a pipe, comprising:

a plastic hose that is collapsed under force, and, in a free state, is un-collapsed and has annular cross-section;

wherein the force is a vacuum within the hose;

wherein the plastic hose surrounds a flexible pipe; and wherein the flexible pipe has regular openings that maintain the vacuum within the plastic hose.

2. The device of claim 1, wherein the flexible pipe is connected to a vacuum source that maintains the plastic hose in a collapsed state.

3. The device of claim 1, wherein the flexible pipe is connected to a pressure source.

4. The device of claim 1, wherein one of an optical cable and an electric cable is attached to the plastic hose.

5. A method of fixing an optical or electric cable against the inner wall of a pipe, comprising the steps of:

providing the pipe;

providing a plastic hose that is collapsed under force, and, when in a free state, is uncollapsed and is annular in cross-section;

introducing the plastic hose in the collapsed state into the pipe; and removing the force so as to expand the plastic hose into the free state;

wherein the force is a vacuum within the hose; and wherein the step of removing the force includes breaking the vacuum;

wherein the plastic hose surrounds a flexible pipe, and the step of introducing the plastic hose includes introducing the flexible pipe into the pipe; and wherein the flexible pipe has regular openings that maintain the vacuum within the plastic hose.

6. The method of claim 5, further comprising the step of introducing air, gas or liquid into the plastic hose.

7. The method of claim 5, wherein the flexible pipe is disposed within the plastic hose and connected to a vacuum source that maintains the plastic hose in the collapsed state.

8. The method of claim 5, wherein the flexible pipe is connected to a pressure source to expand the plastic hose.

9. The method of claim 5, wherein the plastic hose, when inserted in the pipe, substantially extends the entire length of the pipe.

10. The method of claim 5, wherein the plastic hose is annular in cross-section and, in the free state, has a diameter that is the same size as or larger than a diameter of the pipe.

11. The method of claim 5, wherein the pipe is an inaccessible waste-water pipe.

12. The method of claim 5, further comprising the step of introducing the cable into the pipe together with a plastic hose in the collapsed state and fixing the cable and plastic hose in the pipe by admitting an element such as air, gas or liquid into the plastic hose.

* * * * *